United States Patent
Zanbaghi et al.

(10) Patent No.: US 9,970,825 B2
(45) Date of Patent: May 15, 2018

(54) TEMPERATURE SENSING WITH FEEDBACK DIGITAL-ANALOG CONVERTER (DAC) OF DELTA-SIGMA MODULATOR

(71) Applicant: Cirrus Logic International Semiconductor Ltd., Edinburgh (GB)

(72) Inventors: Ramin Zanbaghi, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 348 days.

(21) Appl. No.: 14/826,973

(22) Filed: Aug. 14, 2015

(65) Prior Publication Data
US 2017/0045403 A1    Feb. 16, 2017

(51) Int. Cl.
*G01K 7/01*    (2006.01)

(52) U.S. Cl.
CPC ............ *G01K 7/01* (2013.01); *G01K 2219/00* (2013.01)

(58) Field of Classification Search
CPC ........................................................ G01K 7/01
See application file for complete search history.

(56) References Cited

U.S. PATENT DOCUMENTS

| | | | | |
|---|---|---|---|---|
| 5,070,332 A * | 12/1991 | Kaller | ................. | H03M 1/0619 341/136 |
| 7,633,422 B2 * | 12/2009 | Blatz | ..................... | H03M 3/322 341/158 |
| 7,791,516 B2 * | 9/2010 | Ceballos | ............... | H03M 3/368 341/143 |
| 8,262,286 B2 * | 9/2012 | Peterson | .................. | G01K 7/01 327/512 |
| 9,425,816 B1 * | 8/2016 | Yang | ..................... | H03M 1/066 |
| 2005/0017889 A1 | 1/2005 | Stockstad | | |
| 2007/0052561 A1 | 3/2007 | McLeod et al. | | |
| 2010/0271246 A1 | 10/2010 | Chern et al. | | |
| 2014/0086278 A1 | 3/2014 | Welland | | |
| 2014/0333330 A1 * | 11/2014 | Tai | ..................... | G01R 27/2605 324/679 |

OTHER PUBLICATIONS

Aita et al., "Low-Power CMOS Smart Temperature Sensor With a Batch-Calibrated Inaccuracy of ± 0.25 ° C (±3s) from -70° C to 130° C", IEEE Sensors Journal, vol. 13. No. 5, May 2013, pp. 1840-1848.
Pu et al., "A ±0.4° C Accurate High-Speed Remote Junction Temperature Sensor with Digital Beta Correction and Series-Resistance Cancellation in 65nm CMOS", 2013 Symposium on VLSI Circuits Digest of Technical Papers, pp. C214-C215.

* cited by examiner

*Primary Examiner* — Clayton E Laballe
*Assistant Examiner* — Leon W Rhodes, Jr.
(74) *Attorney, Agent, or Firm* — Norton Rose Fulbright US LLP

(57) ABSTRACT

A delta-sigma modulator may be used to generate temperature information within an integrated circuit. The delta-sigma modulator may include a loop filter, a quantizer, and a feedback digital-to-analog converter (DAC). Temperature sensing elements may be incorporated into the feedback DAC of the delta-sigma modulator. Temperature information is then processed in the loop filter of the delta-sigma modulator and output in an average voltage value of a digital signal output from the delta-sigma modulator.

20 Claims, 4 Drawing Sheets

TEMPERATURE SENSING WITH FEEDBACK DIGITAL-ANALOG CONVERTER (DAC) OF DELTA-SIGMA MODULATOR

FIELD OF THE DISCLOSURE

The instant disclosure relates to temperature sensors. More specifically, portions of this disclosure relate to temperature sensors for integrated circuits.

BACKGROUND

Temperature information is used throughout integrated circuits for many purposes. For example, temperature information may be used to monitor whether devices in the integrated circuit are operating outside of optimal operating conditions. Some components, such as certain transistors, may be damaged if operated above a certain temperature due to accelerated dielectric breakdown. Temperature information may be used to decide whether to turn off or slow down operation of the transistor. As another example, temperature information may be used for calibrating outputs from certain components. For example, the output of certain current sources, such as in amplifier systems, may vary based on operating temperature. Temperature information may be used to calibrate the output of those components and normalize operation of the device for various temperatures.

Temperature sensing is conventionally performed through a separate module. The temperature information generated by the sensing operation may then be converted into a desired format. That desired format may be a digital signal when the temperature sensing only provides analog information. Thus, the temperature sensing module may be coupled to an analog-to-digital converter (ADC) module for conversion to the desired digital data format. One example of such an arrangement is shown in FIG. 1. FIG. 1 is a circuit schematic illustrating a conventional temperature sensor based on two bipolar junction (BJT) transistors for coupling to an analog-to-digital converter (ADC). A temperature sensing module 110 may include transistors 114 and 118 coupled to current sources 112 and 116, respectively. The current sources 112 and 116 may be proportional-to-absolute-temperature (PTAT) current sources. The PTAT current sources 112 and 116 generate different current at different temperatures, thus the temperature may be sensed by measuring the currents. The output of PTAT current sources 112 and 116, and thus temperature, may be measured with transistors 114 and 118, respectively, through an analog-to-digital converter (ADC) module 120. The analog-to-digital converter module 120 may be a shared component in an integrated circuit, such that the ADC module 120 may be used to convert temperature information from temperature sensing module 110 when desired or may be used to convert other analog information when desired. Temperature information is obtained by the ADC module 120 for processing by using switches to couple the ADC module 120 to receive voltages across the transistors 114 and 118. In particular, the ADC module 120 may receive $V_{BE1}$ and $V_{BE2}$ inputs corresponding to voltages across the base and emitter nodes of the transistors 118 and 114, respectively.

The circuit of FIG. 1 has disadvantages in the use of two transistors 114 and 118 and two current sources 112 and 116. By duplicating elements in an integrated circuit, the size of the integrated circuit is increased and the cost of manufacturing the integrated circuit is increased. Further, to obtain accurate temperature information, the two transistors 114 and 118 must be matched and differentially sampled. This matching requirement increases the cost of the manufacturing process. The differential sampling results in a large number of components, including switches 122, 124, 126, 128, 130, 132, 134, 136, and 138 and capacitors 140 and 142 used to couple the ADC module 120 to the temperature sensing module 110.

Another example configuration for a conventional combination of temperature sensing module and analog-to-digital converter (ADC) module is shown in FIG. 2. FIG. 2 is a circuit schematic illustrating a conventional temperature sensor based on one bipolar junction transistor (BJT) for coupling to an analog-to-digital converter (ADC). The configuration of FIG. 2 includes a single transistor 216 coupled to PTAT current sources 212 and 214 in a temperature sensing module 210. The configuration of FIG. 2 is thus improved over that of FIG. 1 because of the reduction in number of transistors in the temperature sensing module 210. However, an ADC module 220 coupled to the temperature sensing module 210 for processing of the temperature information still includes a number of switches and capacitors 222, 224, 226, 228, 230, 232, 234, 236, 238, and 240. Thus, the reduction of one transistor from the configuration of FIG. 1 results in limited improvements in cost and difficulty of manufacturing the integrated circuit. Further, the configuration of FIG. 2 requires a reference voltage input at node 242. Thus, both of the temperature sensing configurations of FIG. 1 and FIG. 2 and of other prior art temperature sensing configurations results in increased complexity, and thus cost, of manufacturing of integrated circuits containing temperature sensing elements. Further, those configurations result in larger die size due to the additional components for coupling the modules together, resulting in a hindrance to further reducing the size of electronic devices. The additional components also provide more potential for errors and noise sources that reduce accuracy of the temperature sensor in the electronic devices.

Shortcomings mentioned here are only representative and are included simply to highlight that a need exists for improved electrical components, particularly for integrated circuits employed in consumer-level devices, such as mobile phones, mobile computing devices, and media players. Embodiments described herein address certain shortcomings but not necessarily each and every one described here or known in the art.

SUMMARY

A delta-sigma modulator may be used to generate temperature information within an integrated circuit. The delta-sigma modulator may include a loop filter, a quantizer, and a feedback digital-to-analog converter (DAC). Temperature sensing elements may be incorporated into, for example, the feedback DAC of the delta-sigma modulator to reduce size and complexity of a temperature sensor in the integrated circuit (IC). Thus, ICs containing the temperature sensor may likewise be reduced in cost and size, resulting in benefits for electronic devices such as mobile devices, cellular telephones, and media players. Further, the reduced number of components in the temperature sensor may improve accuracy by reducing contributions to noise and sources of potential errors.

In certain embodiments, the delta-sigma modulator containing integrated one or more temperature sensing elements, such as integrated in the feedback DAC, may overcome certain shortcomings of the prior art described above and other prior art. For example, certain embodiments may not require an input reference voltage. As another example, certain embodiments do not require differential sampling. As a further example, certain embodiments incorporate only a single transistor, thus eliminating a need for matching multiple transistors within the temperature sensing elements.

The integration of temperature sensing components into a feedback DAC results in a different type of solution than conventional solutions. Whereas conventional solutions attempted to modify the temperature sensing module or the ADC module separately, the disclosed embodiments herein integrate the temperature sensing and the ADC functionality in a delta-sigma modulator. The overall decrease in cost and improved functionality obtained may result in the integrated temperature sensing components offering a better solution than the conventional solutions for temperature sensing. For example, the reduced number of components may result in better accuracy for temperature sensing due to reduced noise and potential error from other components.

In some embodiments with temperature sensing components integrated into a feedback DAC of a delta-sigma modulator, the delta-sigma modulator may have limited or no capability as a multi-purpose ADC in a larger integrated circuit. That is, the temperature information embedded in the feedback signal that also propagates through the loop filter may limit the ability to use the delta-sigma modulator for other ADC functionality in an integrated circuit. In other embodiments, the feedback DAC of the delta-sigma modulator may also be used for other purposes by adding switches for coupling the delta-sigma modulator to other interfaces. Those extra switches for interfaces other than the temperature sensor may be switched off during temperature sensor mode of operation, and enabled when the ADC is used for other purposes. Even when the additional switches are present to allow re-use of the ADC components, the extra switches may be disabled to obtain a minimum amount of hardware for performing temperature measurements. In contrast, conventional solutions required active operation of coupling switches.

According to one embodiment, an apparatus may include a loop filter, a quantizer coupled to the loop filter, a digital-to-analog converter (DAC) coupled between the quantizer and the loop filter, wherein the digital-to-analog converter (DAC) comprises a temperature sensing element, and/or a digital output node coupled to the quantizer, wherein an average value of a voltage at the digital output node comprises temperature information based, at least in part, on an output of the temperature sensing element. If measured digitally, the average voltage value may be calculated digitally by, for example, dividing a number of bits at the modulator output being high during a measurement period by a total measurement time. This value will be the digitally calculated normalized average value of a certain pulse state, such as a high pulse state.

In some embodiments, the apparatus may also include a switch between the second PTAT and the bipolar junction transistor (BJT), wherein the switch is controlled, at least in part, by the digital output node; and/or the apparatus may also include a capacitor coupled between the DAC and the loop filter.

In certain embodiments, the temperature sensing element may include a first proportional-to-absolute-temperature (PTAT) current source, a second PTAT current source, and/or a bipolar junction transistor (BJT); the loop filter may include an integrator comprising an integrator output, a non-inverting input, and an inverting input, wherein the inverting input is coupled to the temperature sensing element and/or a capacitor coupled between the inverting input and the integrator output; no sampling switches are coupled between the DAC and the loop filter; the DAC is directly coupled to the loop filter; the apparatus does not include a feedforward input path for temperature information, and wherein temperature information is generated by the DAC and transmitted to a delta-sigma modulator loop comprising the loop filter; the apparatus may be a delta-sigma analog-to-digital converter (ADC); and/or the delta-sigma ADC may be integrated in an audio CODEC. Referring to the feedback path, unlike conventional solutions having an ADC receiving input from a temperature module, certain disclosed embodiments have no input voltage. Rather, temperature data is embedded in the modulator DAC of the feedback path.

According to another embodiment, a method may include sensing a temperature with a proportional-to-absolute-temperature (PTAT) current source of a temperature sensing element of a digital-to-analog converter (DAC), processing the sensed temperature with a loop filter coupled to the digital-to-analog converter (DAC), and/or quantizing an output of the loop filter to generate a digital output, wherein an average value of a voltage at the digital output comprises information regarding the temperature.

In some embodiments, the method may also include controlling at least a portion of the digital-to-analog converter (DAC) based, at least in part, on the digital output; and/or the method may also include modulating an input of the loop filter with a switched capacitor circuitry-based filter based, at least in part, on a first phase clock signal and a second phase clock signal.

In certain embodiments, the step of controlling the DAC may include toggling a switch between a proportional-to-absolute-temperature (PTAT) current source and a bipolar junction transistor (BJT); and/or the step of processing the sensed temperature with the loop filter may include applying an output of the DAC to an amplifier, such as an operational transconductance amplifier (OTA), of the loop filter, wherein the amplifier is coupled to the DAC only by a sampling capacitor.

According to yet another embodiment, an apparatus may include an amplifier comprising a first input and a second input; one or more other loop filter components coupled to an output of the amplifier, wherein the amplifier and the one or more other loop filter components together comprise a loop filter of a delta-sigma modulator; a quantizer coupled to an output of the one or more loop filter components and configured to output a digital signal; a feedback path coupled between the output digital signal of the quantizer and a digital-to-analog converter (DAC), wherein the DAC is configured to provide temperature information in the feedback path; and/or a sampling capacitor configured to couple the DAC to the first input of the amplifier. In certain embodiments, the first input may be coupled only to the DAC, such that there is no feedforward input path for temperature information.

According to a further embodiment, a method may include processing an analog input with an amplifier and other loop filer components in a loop filter; quantizing an output of the processed analog signal from the loop filter into a digital signal; providing a feedback signal from the quantized output to a digital-to-analog converter (DAC); adding temperature information to the feedback signal at the digital-to-analog converter (DAC); and/or sampling the feedback signal from the digital-to-analog converter (DAC) at the analog input with a sampling capacitor. In certain embodiments, the step of adding temperature information to the feedback signal may include controlling at least a portion of the digital-to-analog converter (DAC) based, at least in part, on the digital output to toggle a switch between a proportional-to-absolute-temperature (PTAT) current source and a bipolar junction transistor (BJT).

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 3:
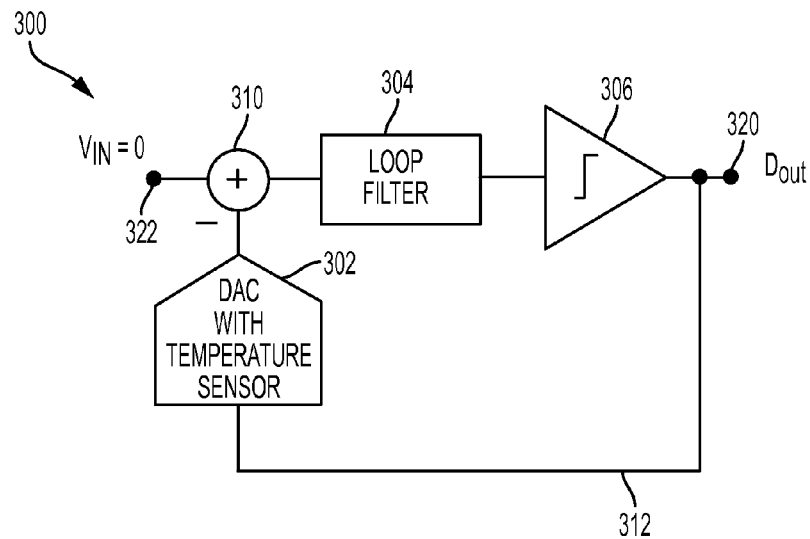
FIG. 3 is a block diagram illustrating a temperature sensing delta-sigma modulator with temperature sensing integrated into a feedback loop of the delta-sigma modulator according to one embodiment of the disclosure.

FIG. 3 is a block diagram illustrating a temperature sensing delta-sigma modulator according to one embodiment of the disclosure. A delta-sigma modulator 300 with an integrated temperature sensing element may provide at an output node 320 with a signal $D_{OUT}$ that includes an indication of the temperature sensed by the integrated temperature sensing element. The signal $D_{OUT}$ may include an indication of temperature information in, for example, an average value of the bit stream of signal $D_{OUT}$. That indication may signal an absolute or relative temperature in the proximity of the modulator 300.

Figure 1:
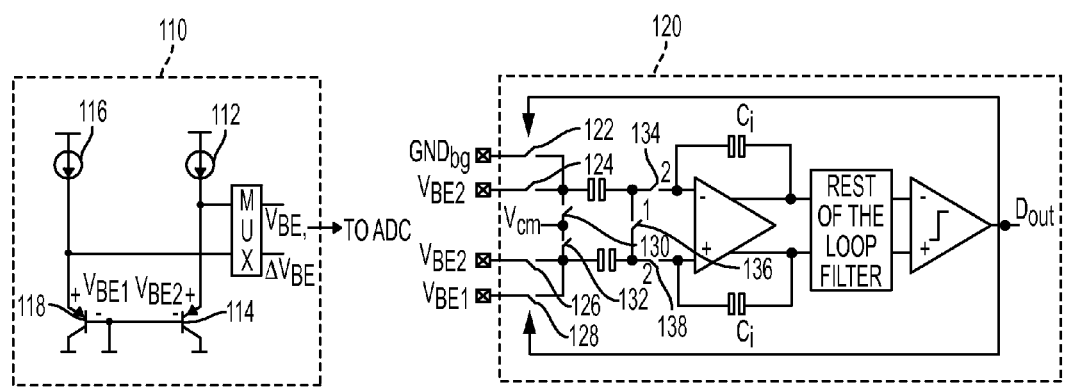
FIG. 1 is a circuit schematic illustrating a conventional temperature sensor based on two bipolar junction (BJT) transistors for coupling to an analog-to-digital converter (ADC).
Figure 2:
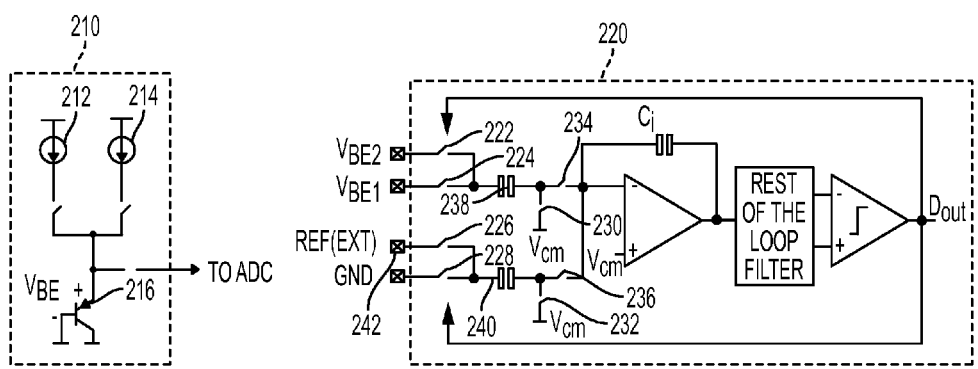
FIG. 2 is a circuit schematic illustrating a conventional temperature sensor based on one bipolar junction transistor (BJT) for coupling to an analog-to-digital converter (ADC).
Figure 4:
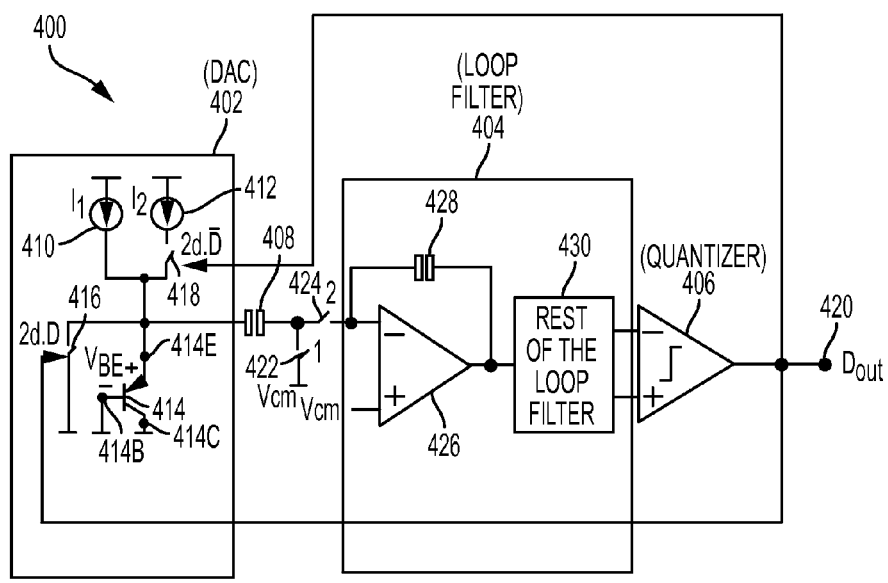
FIG. 4 is a circuit schematic illustrating a temperature sensor integrated into a feedback loop of a delta-sigma modulator according to one embodiment of the disclosure.

The modulator 300 generates the signal $D_{OUT}$ by combining at summation element 310, an input from the input node 322 and an input from a feedback path 312. The feedback path 312 may convert the digital signal $D_{OUT}$ to analog through a feedback DAC 302 coupled to the summation element 310. One or more temperature sensing elements may be incorporated into the feedback DAC 302 to generate temperature information for processing by the rest of the delta-sigma modulator 300. In this configuration, the modulator 300 does not include a feedforward input path for temperature information. The temperature information may be generated by the DAC 302 and transmitted to a delta-sigma modulator loop through the summation element 310, then provided to the loop filter 304 for processing, and quantized by quantizer 306 to produce digital data $D_{OUT}$ at output node 320. When used as a component only for sensing temperature, an input at input node 322 may be a zero voltage signal. Thus, the delta-sigma modulator 300 is generally only converting temperature information into the digital output $D_{OUT}$. Rather than a zero voltage signal, no input node may be provided for the modulator 300, such that there is no feedforward input path. Thus, the modulator 300 may be configured as a closed loop with no input to provide One circuit for implementing a delta-sigma modulator with one or more temperature sensor elements integrated into a feedback loop of a delta-sigma modulator, as described above with reference to FIG. 3, is shown in FIG. 4. FIG. 4 is a circuit schematic illustrating a temperature sensor integrated into a delta-sigma modulator according to one embodiment of the disclosure. A delta-sigma modulator 400 may include a digital-to-analog converter (DAC) 402, a loop filter 404, and a quantizer 406. The output of the loop filter 404 may be coupled to an input of the quantizer 406. The quantizer 406 may output a digital output $D_{OUT}$ at output node 420. The digital output $D_{OUT}$ may be provided through feedback to the loop filter 404 through DAC 402. The DAC 402 may include a temperature sensing element, such as bipolar junction transistor (BJT) 414. In one embodiment, there is no input to the delta-sigma modulator and thus no feedforward path in the delta-sigma modulator 400. Rather, the modulator 400 may include only a feedback path from the quantizer 406 to the loop filter 404 through the DAC 402. Without a feedforward path, an amount of circuitry for the delta-sigma modulator 400 may be reduced compared to the conventional temperature sensors of FIG. 1 and FIG. 2. In particular, without an input or feedforward path, the delta-sigma modulator 400 may include fewer sampling switches. For example, the DAC 402 may be coupled to the loop filter 404 through sampling capacitor 408, switch 422, and/or switch 424. In particular, the sampling capacitor 408 may be directly coupled to the BJT 414.

The BJT 414 may be configured as a temperature sensing element, such as when coupled to a first proportional-to-absolute-temperature (PTAT) current source 410 and a second PTAT current source 412. The bipolar junction transistor (BJT) 414 may include an emitter terminal 414E, a base terminal 414B, and a collector terminal 414C. The emitter terminal 414E may be coupled to a first switch 416 and a second switch 418. The second switch 418 couples the second PTAT current source 410 to the emitter terminal 414E at certain times indicated by a control signal. That control signal may be based on the $D_{out}$ signal received from the quantizer 406. Based on control of the second switch 418, a total current of $I_1$ or $I_1+I_2$ may be applied to the emitter terminal 414E of the BJT 414.

A common mode voltage signal $V_{cm}$ may be used throughout the delta-sigma modulator 400, such as to properly bias certain inputs of the modulator 400. For example, the collector terminal 414C and base terminal 414B of the BJT 414 may be coupled to a common mode voltage $V_{cm}$. The first switch 416 may also be coupled to a common mode voltage $V_{cm}$ and to the emitter terminal 414E of the BJT 414. During certain times indicated by a control signal, the first switch 416 may couple the common mode voltage $V_{cm}$ to the emitter terminal 414E. The control signal for the first switch 416 may be an inverse of the control signal for the second switch 418. Thus, when the second switch 418 is closed to couple current source 412 to the emitter terminal 414E, the first switch 416 may be open. Then, when the second switch 418 opens to disconnect current source 412 from the emitter terminal 414E, the first switch 416 may couple the common mode voltage $V_{cm}$ to the emitter terminal 414E. In other embodiments, some of the terminals of the delta-sigma modulator 400 may not be coupled to the common mode voltage $V_{cm}$ but to other voltages. For example, the collector terminal 414C and the base terminal 414B may be coupled to ground.

The DAC 402 may output a voltage to a first terminal of the sampling capacitor 408. That output may toggle between the base-to-emitter voltage $V_{BE}$ across the base terminal 414B and emitter terminal 414E of the BJT 414 and the common mode voltage $V_{cm}$ applied through the first switch 416. A second terminal of the sampling capacitor 408 may be coupled to a third switch 422 and a fourth switch 424, which may be controlled based on operational mode of the delta-sigma modulator 400 through a first phase clock signal and a second phase clock signal (not shown). The third switch 422 and the fourth switch 424 may function, in conjunction to provide either the output of the DAC 402 or a common mode voltage $V_{cm}$ to the loop filter 404. The third and fourth switches 422 and 424 may be controlled to sample input from the DAC 402 into the loop filter 404.

The sample values provided by the capacitor 408, the third switch 422, and the fourth switch 424 may be input to an amplifier 426, such as an operational transconductance amplifier (OTA). In one embodiment, the amplifier 426 may be configured to receive the sampled input at an inverting input and include a feedback loop through capacitor 428. A non-inverting terminal of the amplifier 426 may be connected to a common mode voltage $V_{cm}$. The output terminal of the amplifier 426 may be further connected to additional loop filter circuitry 430. An output of the additional loop filter circuitry 430 may be coupled to the input of the quantizer 406. The output of the quantizer 406, digital output $D_{OUT}$ at output node 420, may then be used, at least in part, to control the first switch 416 and the second switch 418. Although one configuration for a loop filter 404 may include the amplifier 426 configured as illustrated in FIG. 4, other configurations of loop filter 404 are possible. For example, different configurations of loop filter 404 may include applying an input signal from the DAC 402 to the non-inverting input of the amplifier 426 and/or applying different feedback paths around the amplifier 426.

The delta-sigma modulator 400 may provide in the digital output $D_{OUT}$ information containing temperature data. That temperature data may indicate an ambient temperature around the delta-sigma modulator 400. For example, when the delta-sigma modulator 400 is incorporated into an integrated circuit (IC) controller for use as an audio coder/decoder (CODEC), the modulator 400 may provide the controller with information regarding the temperature of the integrated circuit. The controller may then use the temperature information to adjust operations carried out by the controller. In one embodiment, the temperature information may be used along with calibration tables or a programmed algorithm to maintain a desired output of the audio CODEC IC despite variations in temperature.

Figure 5:
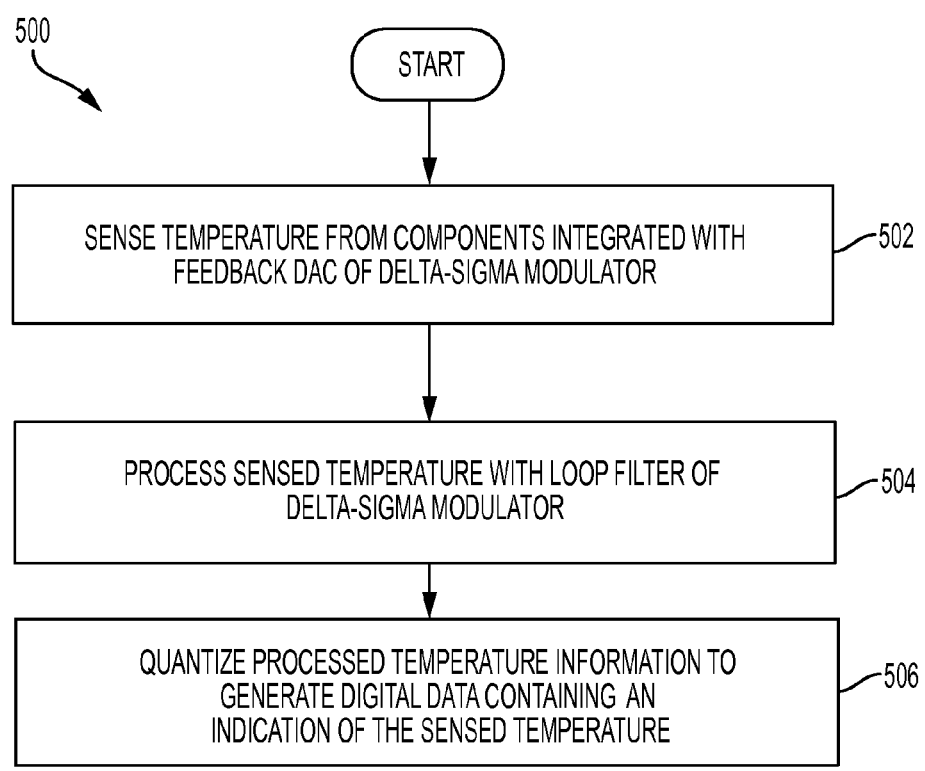
FIG. 5 is a flow chart illustrating a method for generating temperature information according to one embodiment of the disclosure.

A delta-sigma modulator, such as the modulator 400 of FIG. 4, may be configured to perform temperature sensing as described in FIG. 5. FIG. 5 is a flow chart illustrating a method for generating temperature information according to one embodiment of the disclosure. A method 500 may begin at block 502 with sensing a temperature with components of a feedback digital-to-analog converter (DAC) of a delta-sigma modulator. The DAC may include one or more PTAT current source and a transistor, such as the first PTAT current source 410, the second PTAT current source 412, and the BJT 414 as in the modulator 400 of FIG. 4. The temperature information is then contained in the feedback signal of the delta-sigma modulator. A zero input signal may be provided as the input to the delta-sigma modulator, such that the output of the delta-sigma modulator is thus the temperature information added in the feedback signal by the temperature elements of the feedback DAC.

Then, at block 504, the sensed temperature may then be processed with a digital loop filter coupled to the DAC, such as the loop filter 404 shown in FIG. 4. Prior to block 504, the sensed temperature information may be sampled through switched capacitor circuitry coupling the DAC to the loop filter. Next, at block 506, the output of the loop filter may then be quantized, such that an output of the quantizer includes temperature information. That temperature information may be contained in an average output level of the quantizer, such as provided at output node 420 from the quantizer 406 shown in FIG. 4.

In addition to the benefits described through the description above, the various embodiments of a delta-sigma modulator with a temperature sensor may provide other benefits. For example, certain embodiments do not require a zero temperature coefficient (ZTC) reference voltage. Further, certain embodiments do not require differential sampling. Additionally, certain embodiments include only one PNP current source, thus eliminating the matching requirement of temperature sensors having two or more PNP current sources.

The schematic flow chart diagram of FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although analog-to-digital converters (ADCs) are described throughout the detailed description, aspects of the invention may be applied to the design of other converters, such as digital-to-analog converters (DACs) and digital-to-digital converters, or other circuitry and components based on delta-sigma modulation. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a loop filter;
   a quantizer coupled to the loop filter;
   a digital-to-analog converter (DAC) coupled between the quantizer and the loop filter, wherein the digital-to-analog converter (DAC) comprises a temperature sensing element; and
   a digital output node coupled to the quantizer, wherein an average value of a voltage at the digital output node comprises temperature information based, at least in part, on an output of the temperature sensing element.

2. The apparatus of claim 1, wherein the temperature sensing element comprises:
   a first proportional-to-absolute-temperature (PTAT) current source;
   a second PTAT current source; and
   a bipolar junction transistor (BJT).

3. The apparatus of claim 2, further comprising a switch between the second PTAT and the bipolar junction transistor (BJT), wherein the switch is controlled, at least in part, by the digital output node.

4. The apparatus of claim 1, wherein the loop filter comprises:
   an integrator comprising an amplifier output, a non-inverting input, and an inverting input, wherein the inverting input is coupled to the temperature sensing element; and
   a capacitor coupled between the inverting input and the amplifier output.

5. The apparatus of claim 1, further comprising a capacitor coupled between the DAC and the loop filter.

6. The apparatus of claim 1, wherein the DAC is directly coupled to the loop filter.

7. The apparatus of claim 1, wherein temperature information is generated by the DAC and transmitted to a delta-sigma modulator loop comprising the loop filter, and wherein the only input to the loop filter is data from the DAC.

8. The apparatus of claim 1, wherein the apparatus comprises a delta-sigma analog-to-digital converter (ADC).

9. The apparatus of claim 8, wherein the delta-sigma ADC is integrated in an audio CODEC.

10. A method, comprising:
    sensing a temperature with a temperature sensing element of a digital-to-analog converter (DAC);
    processing the sensed temperature with a loop filter coupled to the digital-to-analog converter (DAC); and
    quantizing an output of the loop filter to generate a digital output, wherein an average value of a voltage at the digital output comprises information regarding the temperature.

11. The method of claim 10, further comprising controlling at least a portion of the digital-to-analog converter (DAC) based, at least in part, on the digital output.

12. The method of claim 11, wherein controlling the DAC comprises toggling a switch between a proportional-to-absolute-temperature (PTAT) current source and a bipolar junction transistor (BJT).

13. The method of claim 10, wherein the step of processing the sensed temperature with the loop filter comprises applying an output of the DAC to an amplifier of the loop filter, wherein the amplifier is coupled to the DAC only by a sampling capacitor.

14. The method of claim 10, further comprising modulating an input of the loop filter with switched capacitor circuitry based filter based, at least in part, on a first phase clock signal and a second phase clock signal, wherein the first and second phase clock signals and the digital output control switches in the DAC.

15. An apparatus, comprising:
    an amplifier comprising a first input;
    one or more other loop filter components coupled to an output of the amplifier, wherein the amplifier and the one or more other loop filter components together comprise a loop filter of a delta-sigma modulator;
    a quantizer coupled to an output of the one or more loop filter components and configured to output a digital signal;
    a feedback path coupled between the output digital signal of the quantizer and a digital-to-analog converter (DAC), wherein the DAC is configured to provide temperature information in in the feedback path; and
    a sampling capacitor configured to couple the DAC to the first input of the amplifier.

16. The apparatus of claim 15, wherein the temperature sensing element comprises:
    a first proportional-to-absolute-temperature (PTAT) current source;
    a second PTAT current source; and
    a bipolar junction transistor (BJT).

17. The apparatus of claim 16, further comprising a switch between the second PTAT and the bipolar junction transistor (BJT), wherein the switch is controlled, at least in part, by the output digital signal.

18. The apparatus of claim 15, wherein the first input is coupled only to the DAC.

19. A method, comprising:
   processing an analog input with an amplifier and other loop filer components in a loop filter;
   quantizing an output of the processed analog signal from the loop filter into a digital signal;
   providing a feedback signal from the quantized output to a digital-to-analog converter (DAC);
   adding temperature information to the feedback signal at the digital-to-analog converter (DAC); and
   sampling the feedback signal from the digital-to-analog converter (DAC) at the analog input with a sampling capacitor.

20. The method of claim 19, wherein the step of adding temperature information to the feedback signal comprises controlling at least a portion of the digital-to-analog converter (DAC) based, at least in part, on the digital output to toggle a switch between a proportional-to-absolute-temperature (PTAT) current source and a bipolar junction transistor (BJT).

* * * * *